United States Patent
Esposito et al.

(10) Patent No.: US 12,454,981 B2
(45) Date of Patent: Oct. 28, 2025

(54) COVER APPARATUS FOR USE WITH AIRCRAFT HINGE INTERFACES

(71) Applicant: The Boeing Company, Arlington, VA (US)

(72) Inventors: Antonio Esposito, Long Beach, CA (US); John Michael Bilek, Corona, CA (US)

(73) Assignee: The Boeing Company, Arlington, VA (US)

( * ) Notice: Subject to any disclaimer, the term of this patent is extended or adjusted under 35 U.S.C. 154(b) by 62 days.

(21) Appl. No.: 18/407,023

(22) Filed: Jan. 8, 2024

(65) Prior Publication Data
US 2025/0224002 A1    Jul. 10, 2025

(51) Int. Cl.
*F16C 33/76*    (2006.01)
*B64C 9/02*    (2006.01)

(52) U.S. Cl.
CPC ............... *F16C 33/76* (2013.01); *B64C 9/02* (2013.01); *F16C 2326/43* (2013.01)

(58) Field of Classification Search
CPC ...... F16C 41/04; F16C 33/76; F16C 2326/43; B64C 9/02
See application file for complete search history.

(56) References Cited

U.S. PATENT DOCUMENTS

| 5,711,617 | A | * | 1/1998 | Scheller | F16C 33/7896 |
| | | | | | 384/903 |
| 5,711,618 | A | * | 1/1998 | Waskiewicz | F16C 35/045 |
| | | | | | 384/489 |
| 5,816,711 | A | * | 10/1998 | Gingrich | F16C 33/7896 |
| | | | | | 384/488 |
| 6,193,418 | B1 | * | 2/2001 | Yamashita | F16C 41/04 |
| | | | | | 384/624 |
| 6,283,635 | B1 | * | 9/2001 | Downey | F16C 35/045 |
| | | | | | 384/489 |
| 2018/0141376 | A1 | * | 5/2018 | Lemen | B60B 27/0094 |

FOREIGN PATENT DOCUMENTS

GB    1015369 A    12/1965

OTHER PUBLICATIONS

European Patent Office, "Extended European Search Report", issued in connection with EP Patent Application No. 25150195.3 on May 12, 2025, 10 pages.

* cited by examiner

*Primary Examiner* — John Olszewski
*Assistant Examiner* — Aimee Tran Nguyen
(74) *Attorney, Agent, or Firm* — Hanley, Flight & Zimmerman, LLC

(57) ABSTRACT

Cover apparatus for use with aircraft hinge interfaces are disclosed. An example cover apparatus includes a body defining a first side and a second side opposite the first side. The body is dimensioned to provide a stop against an outer surface of a bearing. A boss protrudes from the first side of the body. The boss is dimensioned for a press-fit connection with a bearing bore of the bearing. A knob protrudes from the second side of the body opposite the first side.

20 Claims, 11 Drawing Sheets

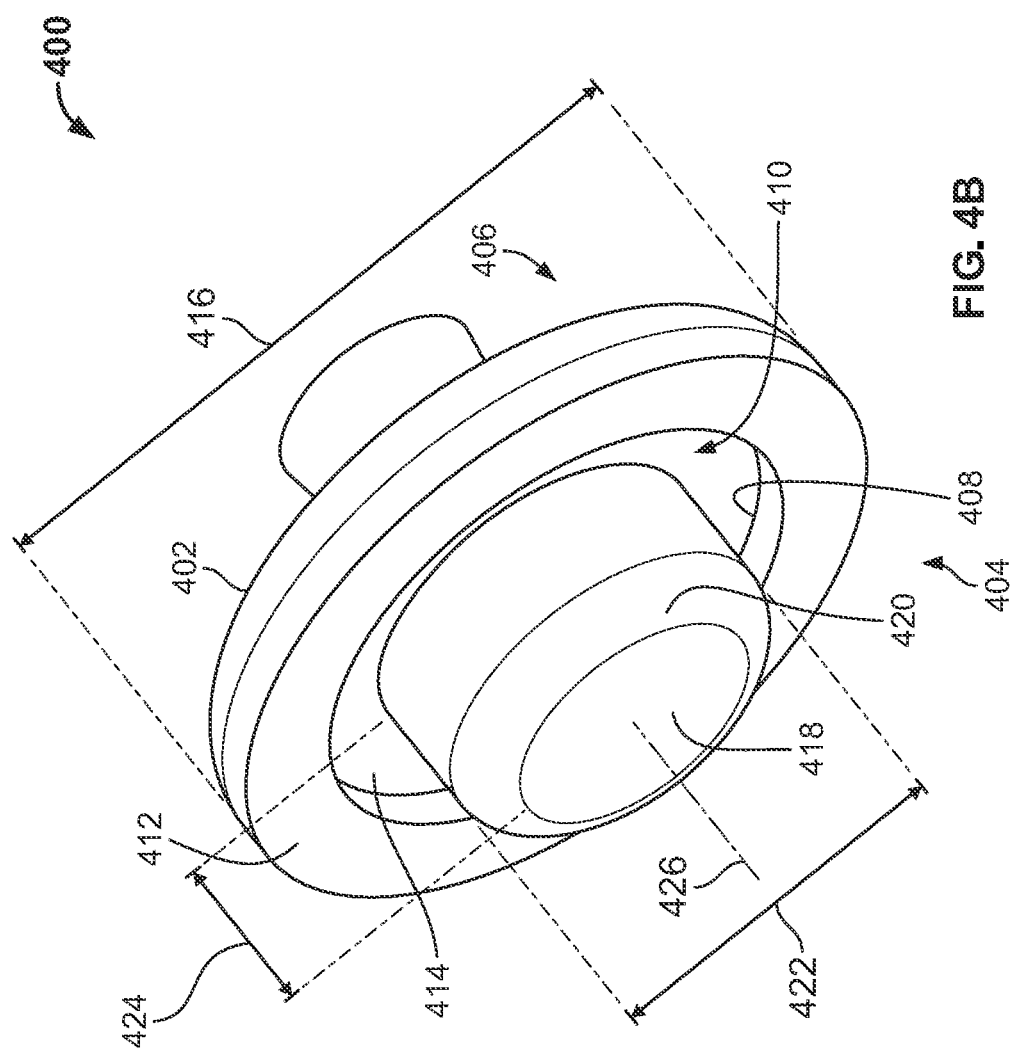
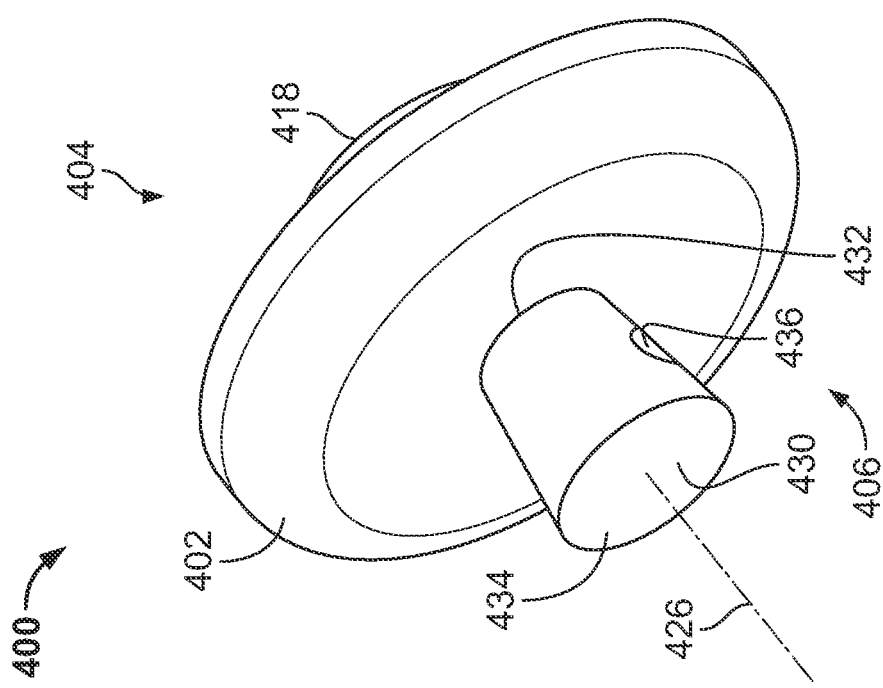
FIG. 4B
FIG. 4A

COVER APPARATUS FOR USE WITH AIRCRAFT HINGE INTERFACES

FIELD OF THE DISCLOSURE

This disclosure relates generally to aircraft manufacturing and, more particularly, to cover apparatus for use with aircraft hinge interfaces.

BACKGROUND

Over the years, aircraft manufactures continue to optimize manufacturing and/or assembly processes of aircrafts to increase manufacturing build times while reducing costs.

SUMMARY

An example cover apparatus includes a body defining a first side and a second side opposite the first side. The body is dimensioned to provide a stop against an outer surface of a bearing. A boss protrudes from the first side of the body. The boss is dimensioned for a press-fit connection with a bearing bore of the bearing. A knob protrudes from the second side of the body opposite the first side.

An example cover assembly for use with a bearing includes a first cover to couple to a first side of a bearing, the first cover including a first protrusion, a first seating surface and a second seating surface. The first cover is dimensioned to be press-fit relative to a bore of the bearing. The cover assembly includes a second cover to couple to a second side of the bearing opposite the first side. The second cover includes a second protrusion, a third seating surface and a fourth seating surface. The second cover is dimensioned to be press-fit relative to the bore of the bearing.

An example method of forming a cover for a bearing includes forming a body defining a first side and a second side, providing a boss protruding from the first side, the boss having a diameter that is greater than a bore diameter of a bearing to which the cover is to couple, and providing a grip protruding from the second side of the body.

BRIEF DESCRIPTION OF THE DRAWINGS

FIGS. 4A and 4B are perspective views of an example cover apparatus in accordance with teachings of this disclosure.

Figure 1:
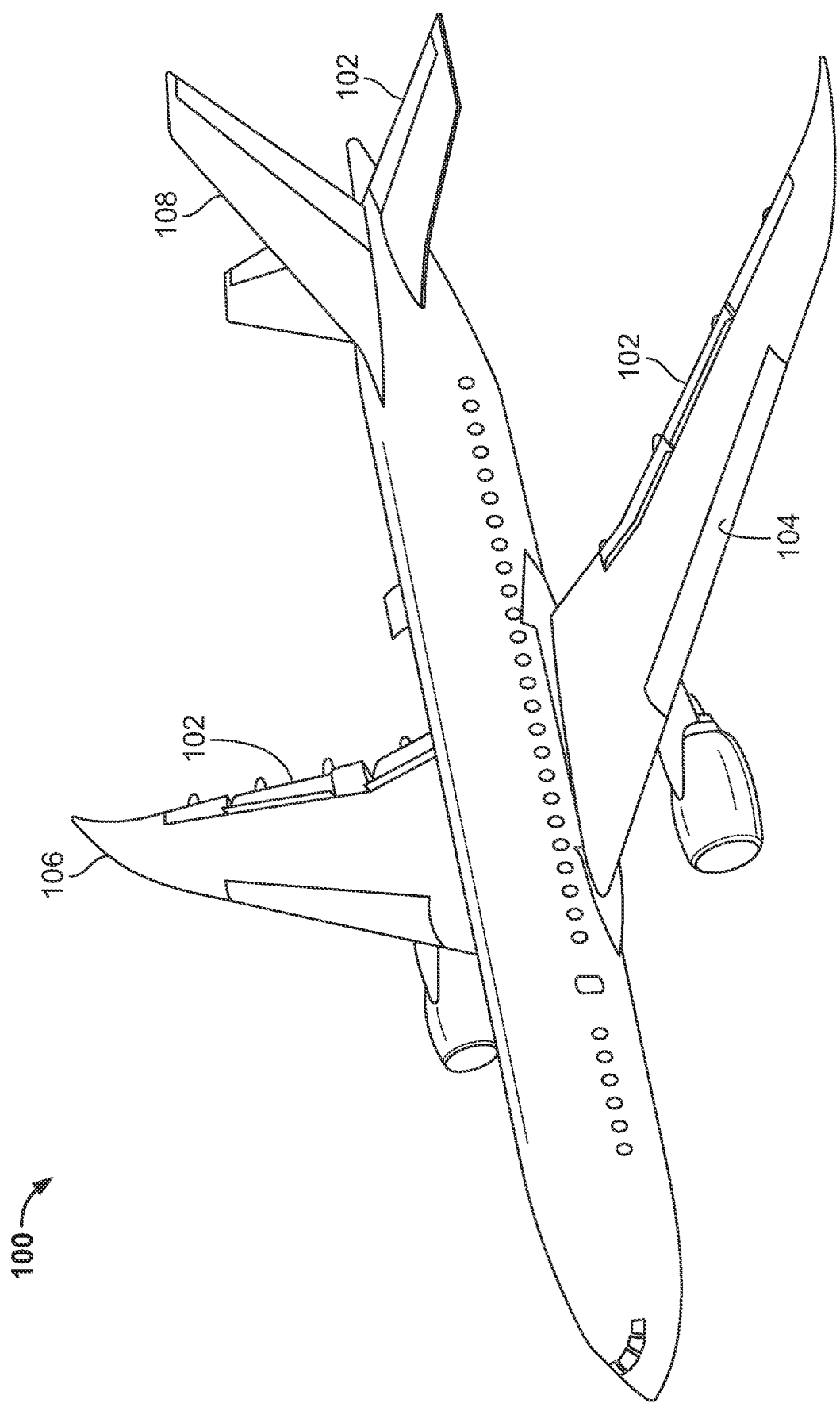
FIG. 1 illustrates an example aircraft disclosed herein.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Many fixed wing aircraft use devices to alter the aerodynamic properties of the wings of the aircraft. Many aircraft utilize a variety of edge devices on the wings, each to provide a different change in wing performance. Trailing edge devices (i.e., devices found on the aft edge of a wing) serve as control surfaces to change the flight direction, orientation, and lift characteristics of the aircraft. Flaps, spoilers, and ailerons are widely used trailing edge devices.

Aircraft employ hinge fittings to pivotally couple control surfaces (e.g., flaps, flaperons, ailerons, spoilers, etc.) to a wing of the aircraft. During assembly and/or maintenance of aircraft, hinge fittings can be exposed prior to attachment of the control surface and the wing. Hinge fittings typically employ bearings that can be susceptible to damage when exposed and maintenance and/or assembly operations are conducted adjacent the exposed bearing. Replacing a bearing of a hinge fitting increases manufacturing and/or repair time. As a result, aircraft remain out of service and/or on the assembly line for an unnecessary or prolonged period of time.

Example cover apparatus disclosed herein protect exposed hinge fittings from damage during manufacturing and/or maintenance of aircraft. Specifically, example covers disclosed herein couple to a hinge fitting to cover an exposed bearing. The covers, when attached to the bearing, protect the bearing from damage. Specifically example cover apparatus disclosed herein are plugs that protect an entire diameter of a bearing. The cover apparatus disclosed herein are configured or structured to seal and/or protect a bearing installed with a mounting bracket. In some examples, cover apparatus disclosed herein can be press-fit with a bearing installed with a bearing interface or bracket.

FIG. 1 illustrates an example aircraft 100 in which example cover apparatus disclosed herein can be employed. The aircraft 100 of the illustrated example includes a plurality of control surfaces 102 (e.g., flaps, alerions, flaperons, spoilers, horizontal stabilizers, a vertical stabilizer, etc.) that can be pivotally coupled to a first wing 104, a second wing 106 and/or a tail 108 of the aircraft 100. While the aircraft 100 illustrates a common commercial aircraft, example cover apparatus disclosed herein can be used with any number of different types of aircraft (e.g., winged aircraft, rotorcraft, etc.), vehicles (e.g., automobiles, off-road vehicles), machining equipment, manufacturing equipment, bearings, ball bearings, and/or any other structure or equipment that employs bearings.

Figure 2:
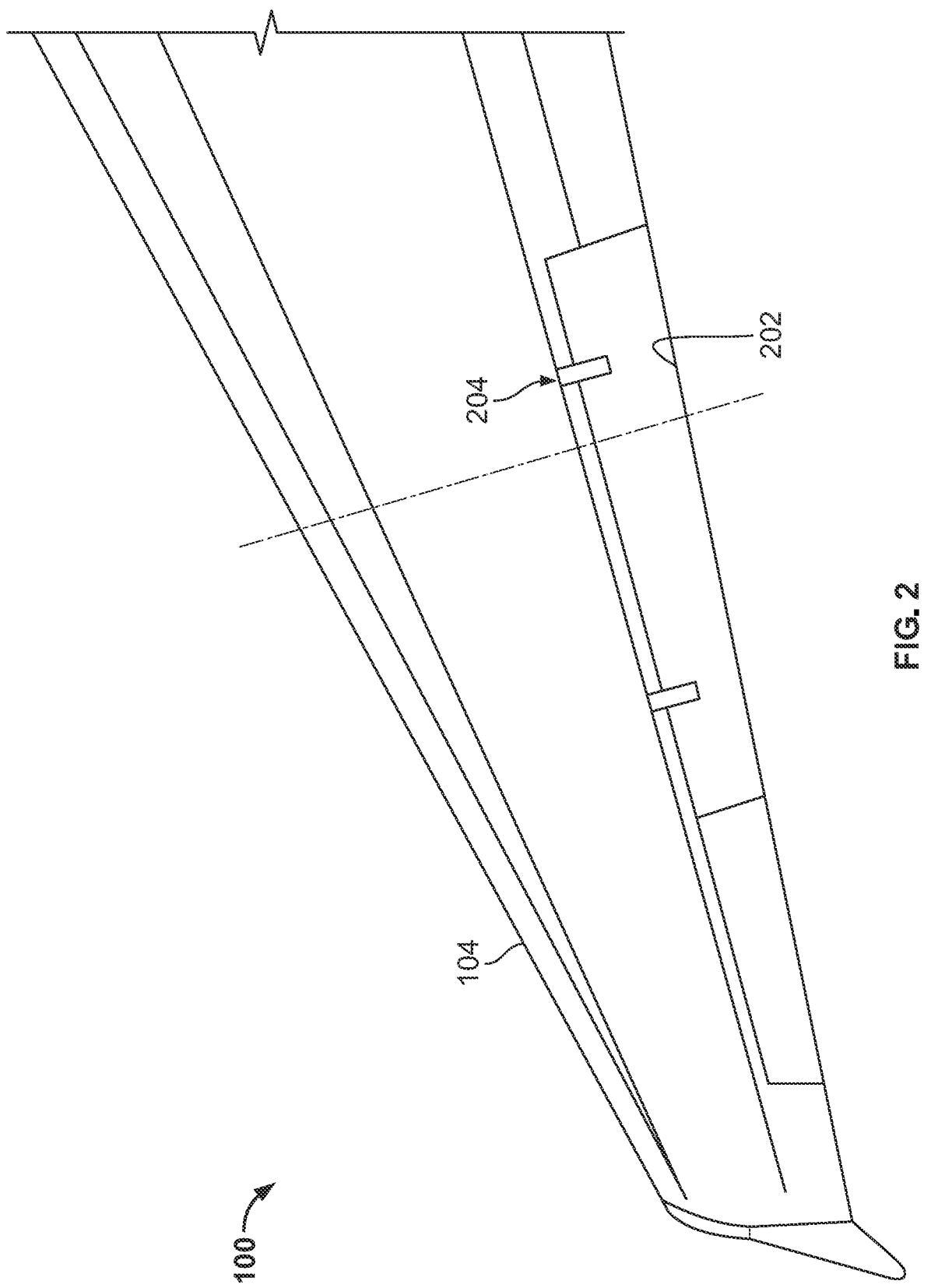
FIG. 2 is a perspective top view of an example wing of the example aircraft of FIG. 1.

FIG. 2 is a perspective top view of the example wing 104 of the example aircraft 100 of FIG. 1. As shown in FIG. 2, a control surface 202 (e.g. a flap, a flaperon, etc.) is pivotally coupled to the wing 104 via a hinge interface 204. The hinge interface 204 of the illustrated example enables the control surface 202 to pivot relative to the wing 104 to alter or adjust flow characteristics of the wing 104.

Figure 3:
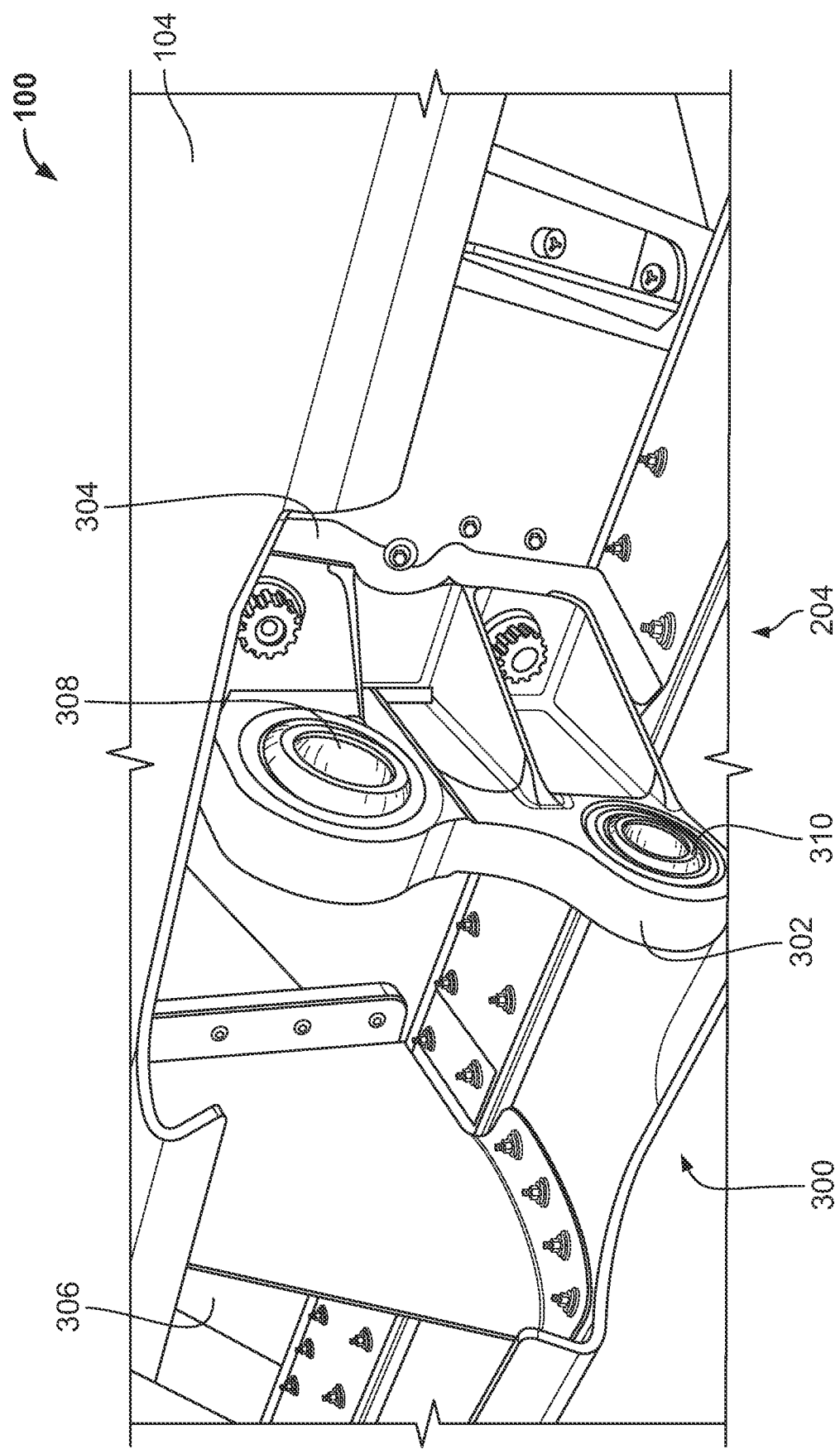
FIG. 3 is a perspective view of an example portion of the example wing of FIG. 2 with an example control surface removed to expose an example hinge interface.

FIG. 3 is a perspective view of a portion 300 of the example wing 104 of FIG. 2 with the control surface 202 removed to expose the hinge interface 204. The hinge interface 204 of the illustrated example is a flap/control surface hinge interface. The hinge interface 204 includes a bracket 302 mounted to an aft spar or frame 304 of a wing box 306 of the wing 104. To enable pivotal movement of the control surface 202 (FIG. 2) relative to the wing 104, the hinge interface 204 includes a first bearing 308 (e.g., a first ball bearing) and a second bearing 310 (e.g., a second ball bearing). The first bearing 308 and the second bearing 310 receive a connector (e.g., shafts, pins, etc.) of the control surface 202 to pivotally mount the control surface 202 (e.g., the flap) relative to the wing 104. During assembly and/or maintenance of aircraft, the hinge interface 204 is exposed prior to attachment of the control surface 202. As a result, dirt or other debris can accumulate in the bearings 308, 310. In some examples, the exposed hinge interface 204 and/or the bearings 308, 310 can be susceptible to damage. Replacement of the bearings 308, 310 may require removal of the bracket 302. Moreover, the bearings 308, 310 are typically press-fit with the bracket 302 so it may be difficult to remove and/or replace, increasing manufacturing and/or maintenance time and costs.

FIGS. 4A and 4B are perspective views of an example cover apparatus 400 in accordance with teachings of this disclosure. The cover apparatus 400 of the illustrated example is a cap or plug that couples to a bearing (e.g., the bearings 308 and/or 310 of FIG. 3). The cover apparatus 400 of the illustrated example includes a body 402 (e.g., a cylindrical body) defining a first side 404 and a second side 406 opposite the first side 404. The first side 404 of the body 402 includes a recess 408 defining a cavity 410. Specifically, the first side 404 of the body 402 defines a first seating surface 412 and a second seating surface 414 different than the first seating surface 412. In the illustrated example, the second seating surface 414 is recessed relative to the first seating surface 412 via the recess 408. In some examples, however, the recess 408 and/or the second seating surface 414 can be omitted. The body 402 of the illustrated example is a cylindrical body having a circular shape defining a body diameter 416. However, in some examples, the body 402 can have a rectangular shape, a square shape, an oblong shape, and/or any other shape(s). The first seating surface 412 of the illustrated example is an annular and/or circumferential ring that is formed by the recess 408. The second seating surface 414 is a base or bottom (e.g., flat) surface defined of the cavity 410. The body diameter 416 of the body 402 is dimensioned to be greater than a diameter of a bearing bore (e.g., a bearing bore 514 of FIG. 5B) of a bearing. In this manner, an outer most surface of the body 402 is not inserted within an opening or bore of a bearing.

The cover apparatus 400 of the illustrated example includes a protrusion or a boss 418 protruding from the first side 404 of the body 402. The boss 418 protrudes from the second seating surface 414 in a direction away from the second seating surface 414. In other words, the boss 418 is a protrusion that is cantilevered from the first side 404 of the body 402. The boss 418 includes a lead-in edge 420 to facilitate insertion of the cover apparatus 400 into a bearing (e.g., the bearing 308 of FIG. 3). The boss 418 of the illustrated example is a cylinder defining a boss diameter 422 and a boss length 424. However, in some examples, the boss 418 of the illustrated example can have a square shape, an oblong shape and/or any other shape. In the illustrated example, the boss 418 is coaxially aligned with a central axis 426 of the body 402. In some examples, the boss diameter 422 is substantially similar (e.g., equal to or slightly larger by approximately one-tenth of an inch) to a bore diameter of a bearing to which the cover is to couple. Thus, the boss diameter 422 is configured (e.g., sized) to enable the boss 418 to be press-fit into a bore (e.g., an opening) of a bearing (e.g., a friction-fit connection). For example, the boss diameter 422 can be sized greater than a diameter of a bearing bore to which the cover apparatus is to couple and the boss 418 compresses (e.g., circumferentially or radially) when the boss 418 is inserted into an opening or bore of the bearing.

The cover apparatus 400 of the illustrated example includes a grip 430 (e.g., a knob, a handle, a peg, etc.) protruding from the second side 406 of the body 402 in a direction away from the second side 406. In other words, the grip 430 of the illustrated example is a protrusion that is cantilevered from the second side 406 of the body 402. The grip 430 of the illustrated example is a cylinder having a varying diameter that increases (e.g., gradually increases, linearly increases) between a first end 432 of the grip 430 attached to the second side 406 of the body 402 and a second end 434 of the grip 430 opposite the first end 432. The varying diameter improves and/or increases a gripping area of the grip 430. In some examples, the grip 430 of the illustrated example can have a square shape, an oblong shape and/or any other shape. In the illustrated example, the grip 430 is coaxially aligned with the boss 418. For instance the grip 430 is coaxially aligned with the central axis 426 of the body 402. The boss diameter 422 is greater than a largest diameter of the grip 430. Additionally, the grip 430 includes an opening 436 (e.g., having a longitudinal axis that is non-parallel relative to the central axis 426) to receive a portion of a tether to couple (e.g., daisy chain) two or more cover apparatus 400. The boss 418 and the bearing generate a frictional force to retain the cover apparatus coupled to the bearing.

The cover apparatus 400 of the illustrated example can be formed as a unitary structure or body (e.g., a monolithic body). For example, the cover apparatus 400 can be formed via injection molding, casting, three-dimensional printing, and/or any other manufacturing process(es). In some examples, the cover apparatus 400 can be a plurality of components (e.g., the body 402, the boss 418, the grip 430, etc.) that couple together via fasteners including, welding, screws, adhesive, thermal welding, and/or any other fasteners and/or fastening process(es). The cover apparatus 400 of the illustrated example can be made from rubber, plastic(s), metal(s), alloy(s), a combination thereof, and/or any other material(s). For example, one or more components of the cover apparatus 400 can include thermoplastic polyurethane (TPU) (e.g., NinjaFlex®), vinyl material(s), acrylonitrile butadiene styrene (ABS) material(s) and/or any other material(s). In some examples, the boss 418 can include a sleeve, a film, a coating, etc., of a rubber material or other material(s) providing gripping or high-friction holding forces.

Figure 5A:
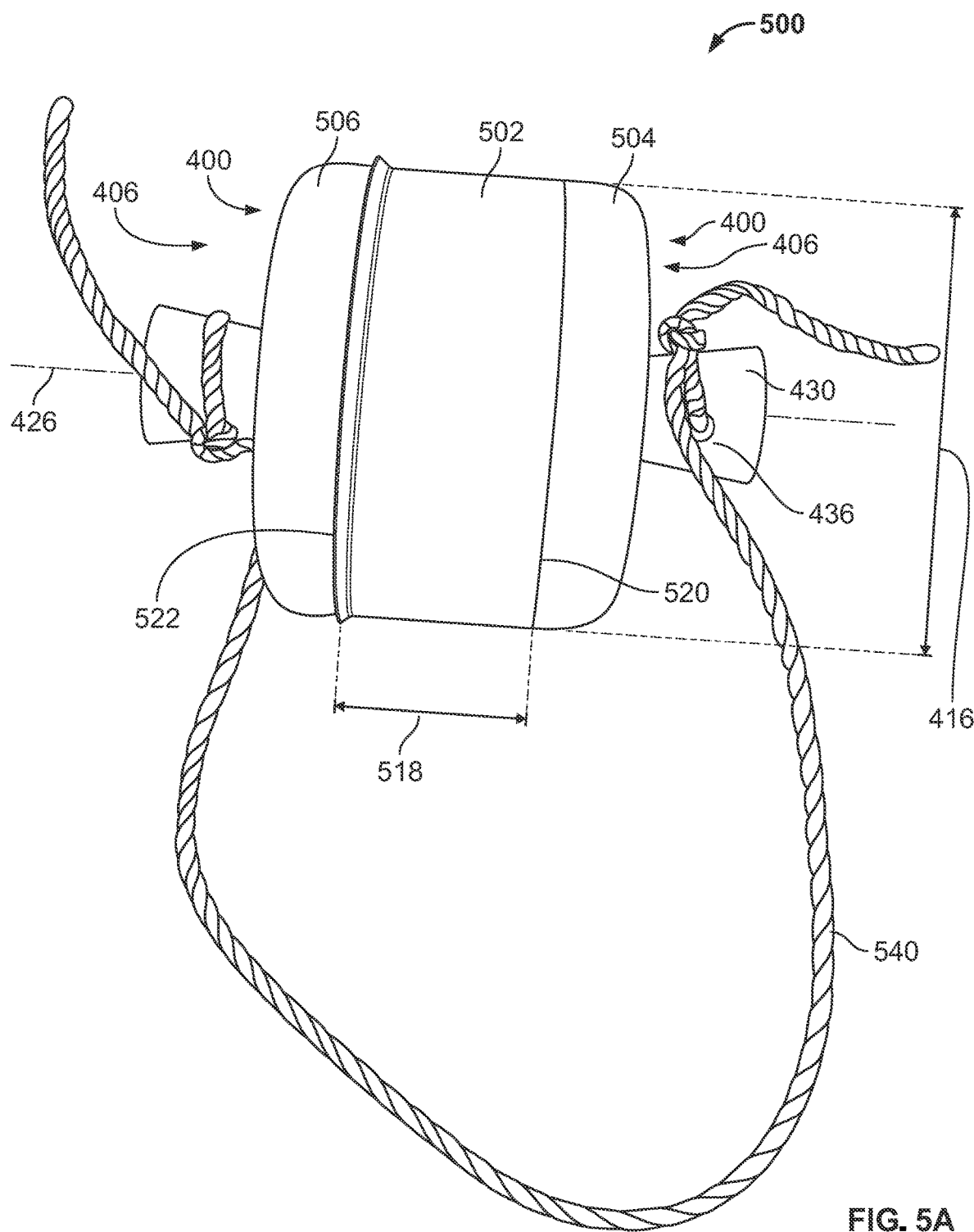
FIG. 5A is a perspective view of an example cover assembly disclosed herein coupled to an example bearing.
Figure 5B:
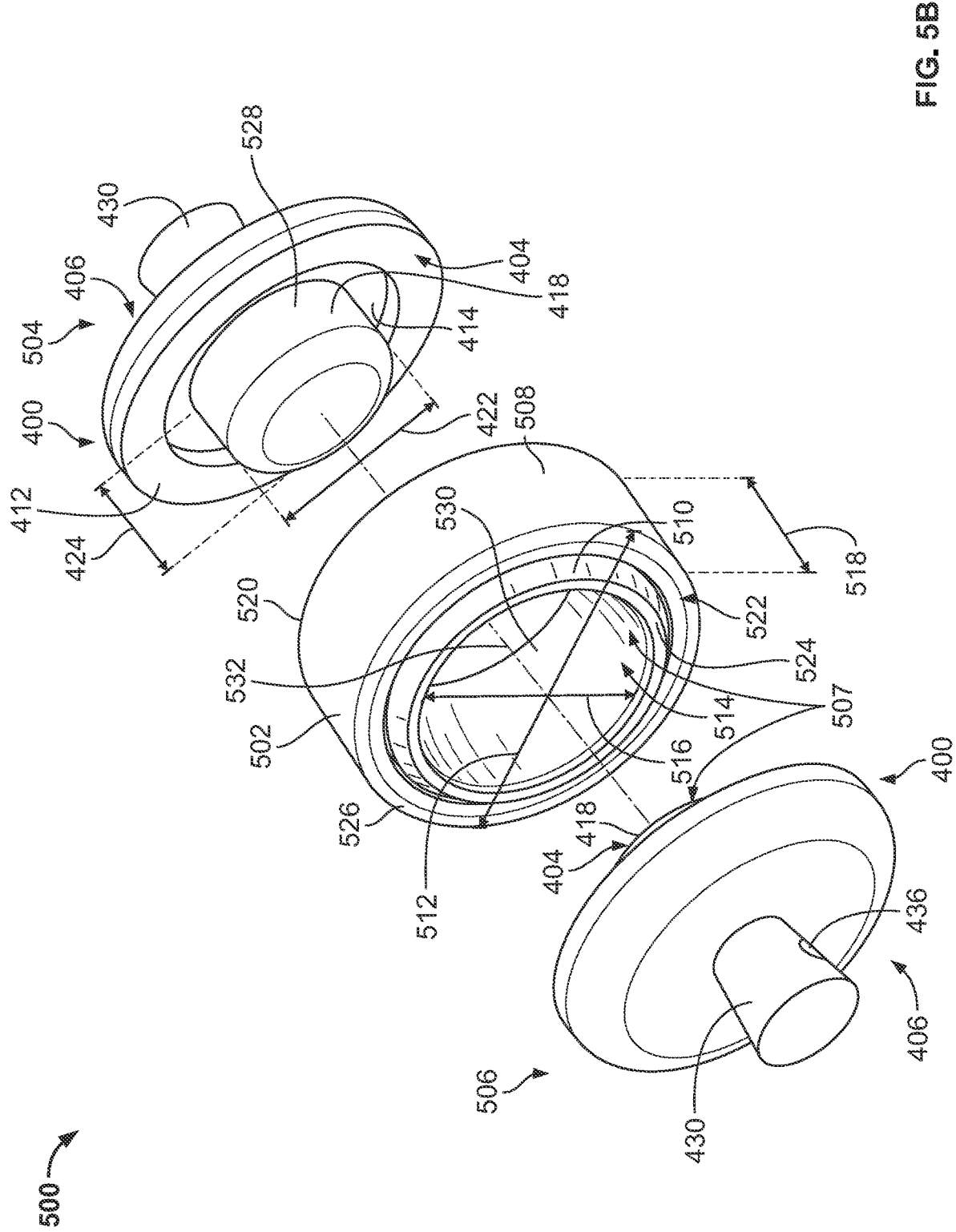
FIG. 5B is an exploded view of the example cover assembly of FIG. 5A.
Figure 5C:
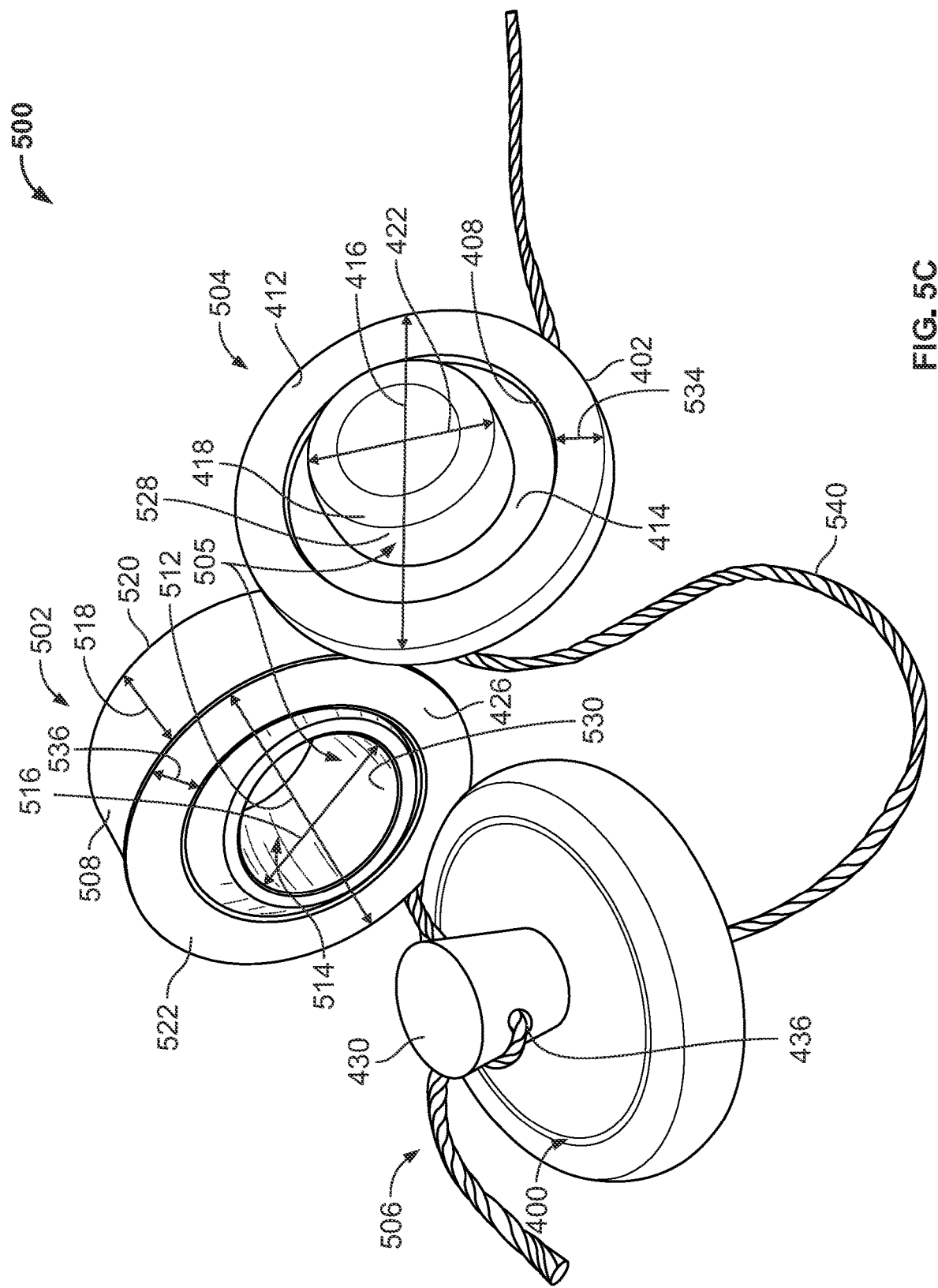
FIG. 5C is a perspective view with the example cover assembly of FIG. 5A decoupled from the example bearing.
Figure 5D:
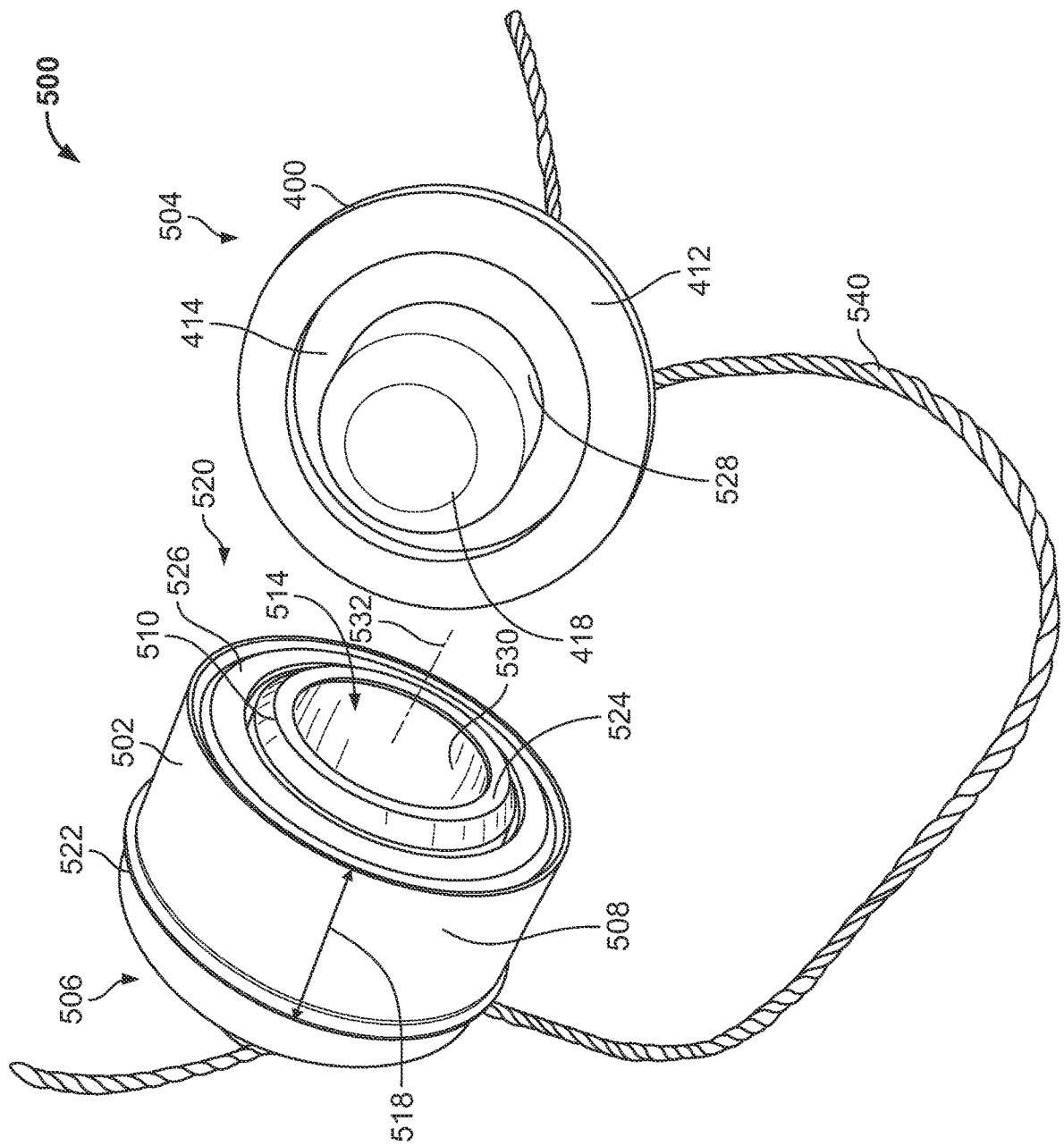
FIG. 5D is a perspective view of the example cover assembly of FIG. 5A in a partially assembled condition.

FIGS. 5A-5D are different views of an example cover assembly 500 disclosed herein coupled to an example bearing 502. FIG. 5A is a perspective view of the example cover assembly 500 coupled to the example bearing 502. FIG. 5B is an exploded view of the cover assembly 500 and the bearing 502. FIG. 5C is a perspective view of the example cover assembly 500 decoupled from the bearing 502. FIG. 5D is a perspective view of the example cover assembly 500 in a partially assembled condition.

The cover assembly 500 of the illustrated example includes a first cover 504 and a second cover 506. The first cover 504 is a first one of the cover apparatus 400 of FIG. 4 and the second cover 506 is a second one of the cover apparatus of FIG. 4. Each of the first cover 504 and the second cover 506 of the illustrated example is identical to the cover apparatus 400 of FIG. 4 and, thus, many of the components of the first cover 504 and the second cover 506 are substantially similar or identical to the components described above in connection with the cover apparatus 400 of FIG. 4. As such, those components will not be described in detail again below. Instead, the interested reader is referred to the above corresponding descriptions for a complete written description of the structure and operation of such components. To facilitate this process, similar or identical reference numbers will be used for like structures as used in FIG. 4 above.

Referring to FIGS. 5A-5D, the first cover 504 and the second cover 506 are coupled to the bearing 502 (e.g., a ball bearing). The bearing 502 of the illustrated example includes an outer ring 508 (e.g., having an outer ring ball race) and an inner ring 510 (e.g., having an inner ring ball race). The outer ring 508 has a diameter 512 and the inner ring 510 defines a bearing bore 514 having a bore diameter 516. The bearing 502 of the illustrated example defines a thickness 518 between a first side 520 of the bearing 502 (e.g., the outer ring) and a second side 522 of the bearing 502 (e.g., the outer ring) opposite the first side 520. An outer side surface 524 (e.g., a first side surface) of the inner ring 510 protrudes or extends past an outer side surface 526 (e.g., a first side surface) of the outer ring 508.

The first cover 504 of the illustrated example is coupled to the first side 520 of the bearing 502 and the second cover 506 is coupled to the second side 522 of the bearing 502 opposite the first side 520. In other words, the first side 404 of the first cover 504 is oriented toward the first side 520 of the bearing 502 and the first side 404 of the second cover 506 is oriented toward the second side 522 of the bearing 502. In the illustrated example, the first cover 504 and the second cover 506 are press-fit into the bearing bore 514 of the bearing 502. Specifically, the first cover 504 and the second cover 506 are coupled to the bearing 502 via a friction-fit connection. For example, the first cover 504 couples to the bearing 502 via a friction-fit connection provided by (e.g., a first interface 505 between) the boss 418 of the first cover 504 and the bearing bore 514, and the second cover 506 couples to the bearing 502 via a friction-fit connection provided by (e.g., a second interface 507 between) the boss 418 of the second cover 506 and the bearing bore 514. Thus, the first cover 504 and the second cover 506 are dimensioned to be coupled to the bearing via a friction-fit connection provided by the first interface 505 between the first protrusion 418 and the bearing bore 514 of the bearing 502 and a second interface 507 provided by the second protrusion 418 and the bearing bore 514 of the bearing 502.

In the illustrated example, the boss 418 of the first cover 504 is press-fit into the bearing bore 514 from the first side 520 of the bearing 502 and the boss 418 of the second cover 506 is press-fit into the bearing bore 514 from the second side 522 of the bearing 502. To provide a press-fit connection between the first cover 504 (e.g., and the second cover 506) and the bearing 502, the boss diameter 422 of the boss 418 is slightly larger than and/or equal to the bore diameter 516 of the bearing bore 514 of the bearing 502. For example, the boss diameter 422 of the boss 418 can be approximately between 0.25 percent to 1 percent larger than the bore diameter 516. For example, the boss 418 can compress (e.g., circumferentially or radially) when the boss 418 is inserted into the bearing bore 514. Additionally, frictional force generated between the outer surface 528 of the boss 418 and the inner surface 530 of the bearing bore 514 retains the first cover 504 coupled to the bearing 502, without requiring other fasteners, glues, tapes, etc. For example, the boss 418 (e.g., an outer surface 528 of the boss 418) and/or the first cover 504 (e.g., and the second cover 506) are composed of a rubbery, a grip-like, or other material(s) that generates friction between the boss 418 and an inner surface 530 of the inner ring 510 when the boss 418 is at least partially inserted in the bearing bore 514. The boss length 424 of the boss 418 that is at least one of: (1) half of a thickness 518 of the bearing 502; or (2) less than half the thickness 518 of the bearing 502. In this manner, the boss 418 of the first cover 504 does not interfere with (e.g., in an axial direction) the boss 418 of the second cover 506 when the first cover 504 and the second cover 506 are coupled to the bearing 502.

When the first cover 504 is coupled to the bearing 502, the body 402 of the first cover 504 is not inserted in the bearing bore 514. Thus, the body 402 of the first over 504 is dimensioned to prevent the body 402 from being inserted into the bearing bore 514. In this manner, the body 402 of the first cover 504 can provide a stop against an outer surface of the bearing 502. Thus, the first seating surface 412 of the first cover 504 engages (e.g., directly contacts) the outer side surface 526 of the outer ring 508 on the first side 520 of the bearing 502. Specifically, the first seating surface 412 is flush mounted or pressed against (e.g., seals against) the outer side surface 526 of the outer ring 508 on the first side 520 of the bearing 502. In some examples, the second seating surface 414 of the first cover 504 engages (e.g., directly contacts) the outer side surface 524 of the inner ring 510 on the first side 520 of the bearing 502. Specifically, the protruding portion of the inner ring 510 engages (e.g., directly contacts) the second seating surface 414 of the first cover 504. For instance, the second seating surface 412 has a diameter that is greater than an outside diameter of the inner ring 510 of the bearing 502. Additionally, at least a portion of the boss 418 of the first cover 504 is received by (e.g., a first side of) the bearing bore 514 of the bearing 502. Thus, although the inner ring 510 protrudes (e.g. laterally away from the outer side surface 526) relative to the outer ring 508, the recess 408 of the body 402 enables the first seating surface 412 to engage the outer side surface 526 of the outer ring 508 and the second seating surface 414 to engage the outer side surface 524 of the inner ring 510 of the bearing 502 when the first cover 504 is coupled to the bearing 502 and the boss 418 is positioned in the bearing bore 514 of the bearing 502.

Likewise, when the second cover 506 is coupled to the bearing 502, the body 402 of the second cover 506 is not inserted in the bearing bore 514. Thus, the body 402 of the first over 504 and/or the second cover 504 is dimensioned to prevent the outer body portion from being inserted into the bearing bore 514. In this manner, the body 402 of the second cover 506 can provide a stop against the outer surface of the bearing 502. Thus, the first seating surface 412 of the second cover 506 engages (e.g., directly contacts) the outer side surface 526 of the outer ring 508 on the second side 522 of the bearing 502 (e.g., provides a stop). Specifically, the first seating surface 412 of the second cover 506 is flush mounted or pressed against (e.g., seals against) the second side surface of the outer ring 508 on the second side 522 of the bearing 502. In some examples, the second seating surface 414 of the second cover 506 engages (e.g., directly contacts) the outer side surface 524 of the inner ring 510 on the second side 522 of the bearing 502. Specifically, the protruding portion of the inner ring 510 engages (e.g., directly contacts) the second seating surface 414 of the second cover 506. For instance, the second seating surface 412 has a diameter that is greater than an outside diameter of the inner ring 510 of the bearing 502. Additionally at least a portion of the boss 418 of the second cover 506 is received by (e.g., a first side of) the bearing bore 514 of the bearing 502. Thus, although the inner ring 510 protrudes (e.g. laterally away from the outer side surface 526) relative to the outer ring 508, the recess 408 of the body 402 enables the first seating surface 412 to engage the outer side surface 526 of the outer ring 508 and the second seating surface 414 to engage the outer side surface 524 of the inner ring 510 of the bearing 502 when the second cover 506 is coupled to the bearing 502 and the boss 418 is positioned in the bearing bore 514 of the bearing 502.

Thus, when both the first cover 504 and the second cover 506 are coupled to the bearing 502, simultaneously, the first seating surfaces 412 of the corresponding first cover 504 and the second cover 506 are flush or seal against the respective outer side surfaces 526 of the outer ring 508. In other words, the bearing 502 is positioned between (e.g., the first seating surface 412 of) the first cover 504 and (e.g., the first seating surface 412 of) the second cover 506.

To couple the first cover 504 to the bearing 502, the first cover 504 is positioned relative to the bearing bore 514 such that the central axis 426 of the first cover 504 aligns (e.g., coaxially aligns) with a longitudinal axis 532 of the bearing bore 514. After the first cover 504 is aligned with the bearing bore 514, a lateral force is applied to the first cover 504 (e.g., a force along the central axis 426 in a direction from the second side 406 of the body 402 toward the first side 404 of the body 402) to move the first cover 504 laterally until the first seating surface 412 engages the outer side surface 526 of the outer ring 508 on the first side 520 of the bearing 502 (e.g., until there is no space between the body 402 of the first cover 504 and the outer side surface 526 of the bearing 502). The first seating surface 412 has an outer diameter (e.g., the body diameter 416) that is substantially equal to the outside diameter 512 of the outer ring 508 of the bearing 502. As a result, the first cover 504 and/or the second cover 506 protects an entire diameter of the bearing 502. Additionally, in the illustrated example, the first seating surface 412 has a thickness 534 that is substantially similar or identical to a thickness 536 of the outer side surface 526 of the outer ring 508. To couple the first cover 504 and the second cover 506, the cover assembly 500 of the illustrated example includes a tether 540. The tether 540 attaches to the opening 436 of the grip 430 of the first cover 504 and the second cover 506. The tether 540 of the illustrated example is a string. However, in some examples, the tether 540 can be a rubber band, a wire, a rope, a zip-tie, and/or any other suitable tether.

Figure 6A:
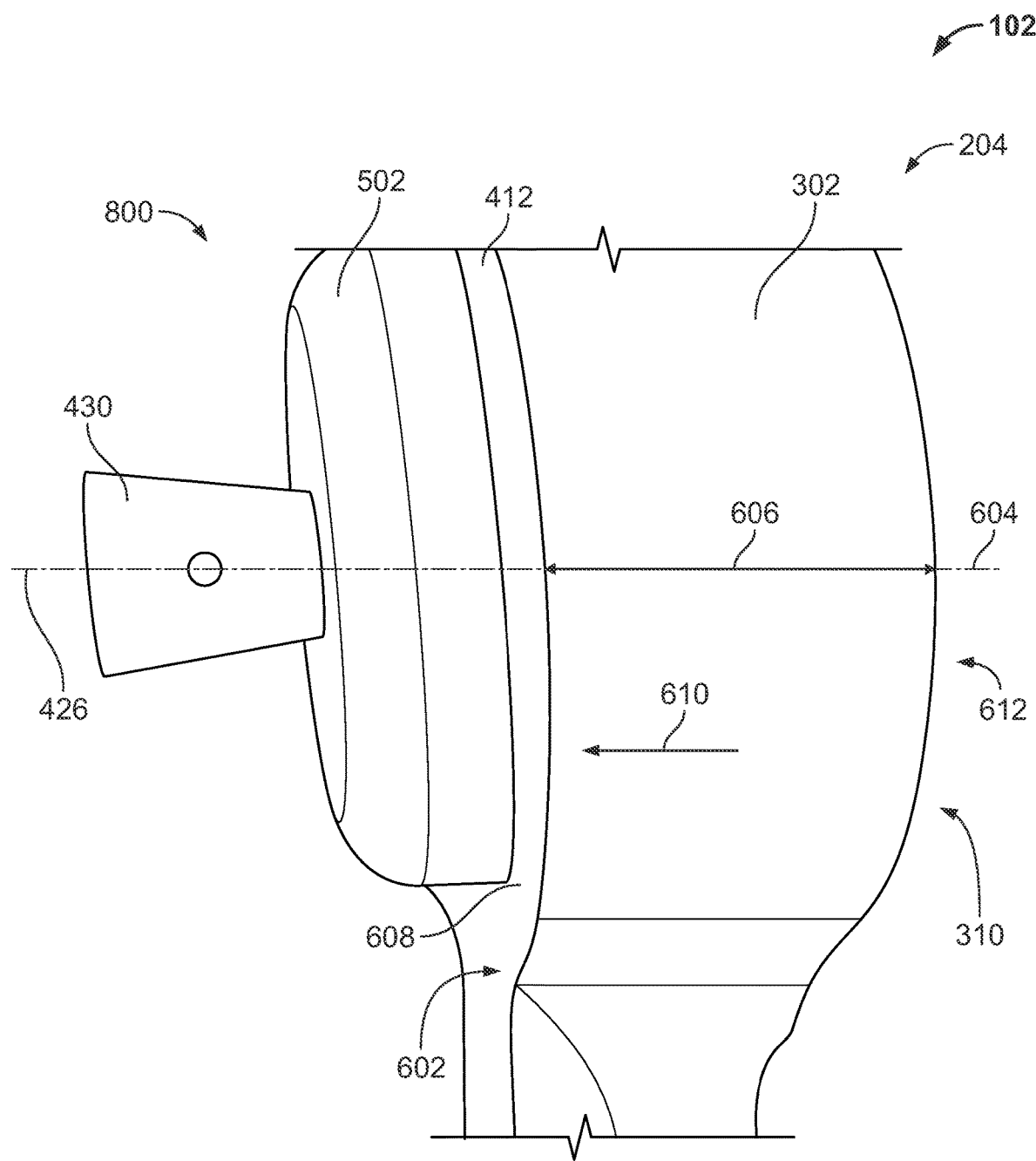
FIGS. 6A and 6B illustrate the example cover assembly of FIGS. 5A-5D coupled to the example hinge interface of FIGS. 2-3.
Figure 6B:
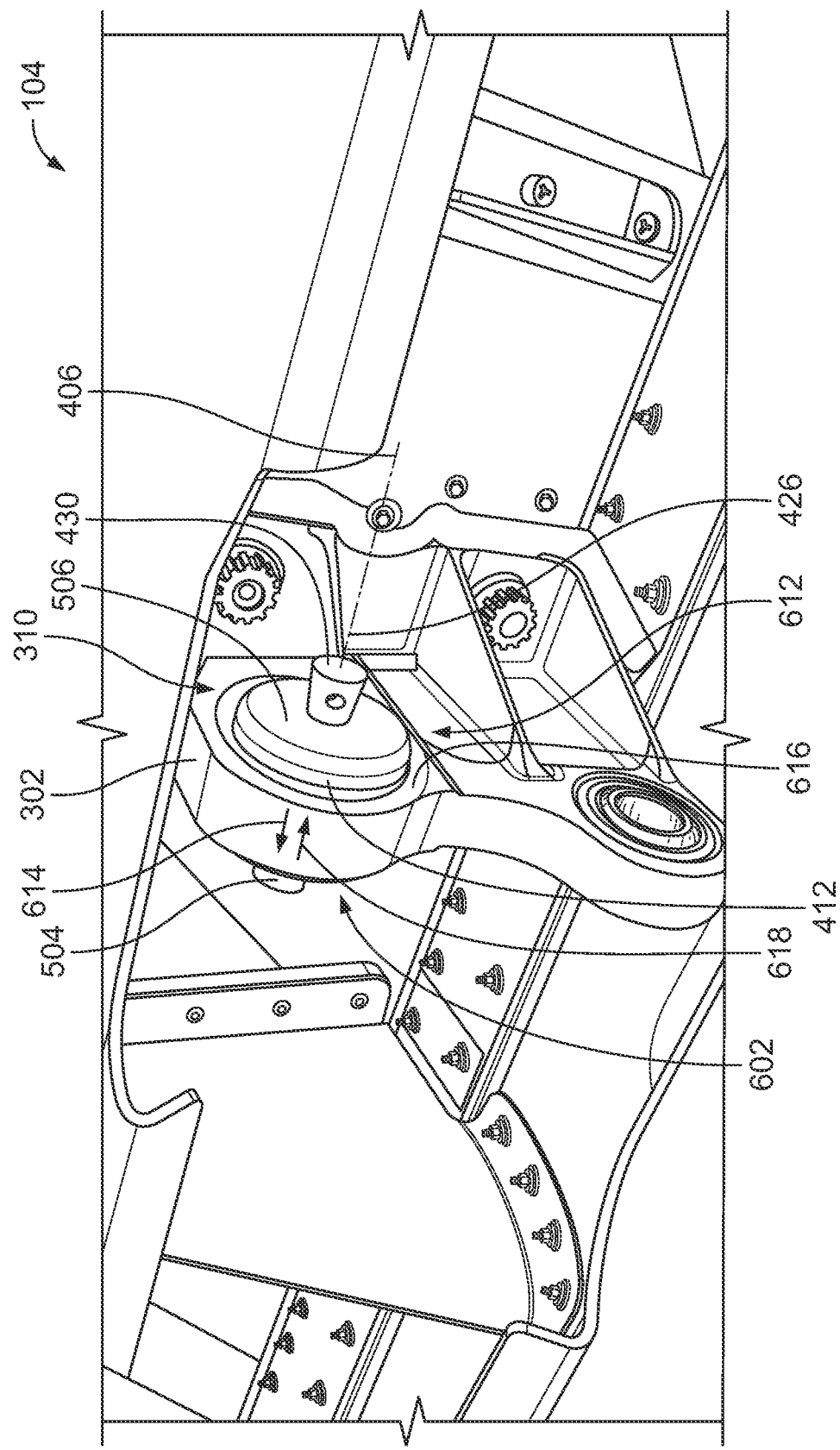

FIG. 6A and FIG. 6B illustrate the cover assembly 500 of FIG. 5 coupled to the hinge interface 204 of FIGS. 2-3. For example, the first cover 504 of the illustrated example is coupled to a first side 602 of the bearing 310. To couple the first cover 504 and the bearing 310, the central axis 426 of the first cover 504 is aligned (e.g., coaxially aligned) with a bore axis 604 of the bearing 310. In other words, the boss 418 of the first cover 504 is inserted into a bearing bore of the bearing 310. A user can grip the first cover 504 via the grip 430 to align the first cover 504 relative to the bearing bore of the bearing 310. Additionally, the user applies a lateral force 606 (e.g., pushes the first cover 504) in a direction toward the bearing 310 to cause the boss 418 to be inserted into the bearing bore of the bearing 310. When inserted, the boss 418 of the first cover 504 frictionally engages an inner surface (e.g., the inner surface 530) of the bearing bore (e.g., the bearing bore 514) to retain the first cover 504 coupled to the bearing 310. As shown, the first seating surface 412 of the first cover 504 engages an outer side surface 608 of the bearing 310 and/or the bracket 302. To decouple the first cover 504 from the bearing 310, a user, via the grip 430, applies a pulling force 610 (e.g., pulls the first cover 504) along the central axis 426 in a direction away from the bearing 310. A pulling force greater than the frictional force between the boss 418 and the inner surface (e.g., the inner surface 530) of the bearing bore causes the first cover 504 to remove, decouple and/or detach from the bearing bore and/or the bearing 310.

The second cover 506 can then be coupled to a second side 612 of the bearing 310 opposite the first side 602. To couple the second cover 506 and the bearing 310, the central axis 426 of the second cover 506 is aligned (e.g., coaxially aligned) with the bore axis 604 of the bearing 310. In other words, the boss 418 of the second cover 506 is inserted into the bearing bore of the bearing 310 (e.g., from the second side 612). A user can grip the second cover 506 via the grip 430 to align the second cover 506 relative to the bearing bore. Additionally, the user applies a lateral force 614 (e.g., pushes the second cover 506) in a direction along the bore axis 604 toward the bearing 310 to cause the boss 418 of the second cover 506 to be inserted into the bearing bore. When inserted, the boss 418 of the second cover 506 frictionally engages an inner surface (e.g., the inner surface 530) of the bearing bore 514 to retain the second cover 506 coupled to the bearing 310. As shown, the first seating surface 412 of the second cover 506 engages a second side surface 616 of the bearing 310 and/or the bracket 302. Additionally, no other fasteners, adhesive, tape, etc., are needed to retain the first cover 504 and the second cover 506 coupled to the bearing 310. To decouple the second cover 560 from the bearing 310, a user, via the grip 430, applies a pulling force 618 (e.g., pulls the second cover 506) along the central axis 426 in a direction away from the bearing 310. A pulling force greater than the frictional force between the boss 418 and the inner surface 530 of the bearing bore causes the second cover 506 to remove, decouple and/or detach from the bearing bore and/or the bearing 310.

In some examples, the cover assembly 500 can be shipped with a bracket and bearing assembly. For example, the cover assembly 500 can be mounted to a bearing (e.g., the bearing 310) of a bracket (e.g., the bracket 302) at a warehouse or manufacturing facility. Other than the frictional engagement between the cover assembly and the bearing, no other fasteners, adhesive, tape, etc. are needed to retain the cover assembly 500 coupled with the bearing 310. In this manner, the cover assembly 500 can protect a bearing from damage during shipping or transporting the bracket and bearing assembly. In some examples, a seal (e.g., an O-ring) or gasket can be positioned between the first seating surface 412 and an outer side surface of a bearing.

Figure 7:
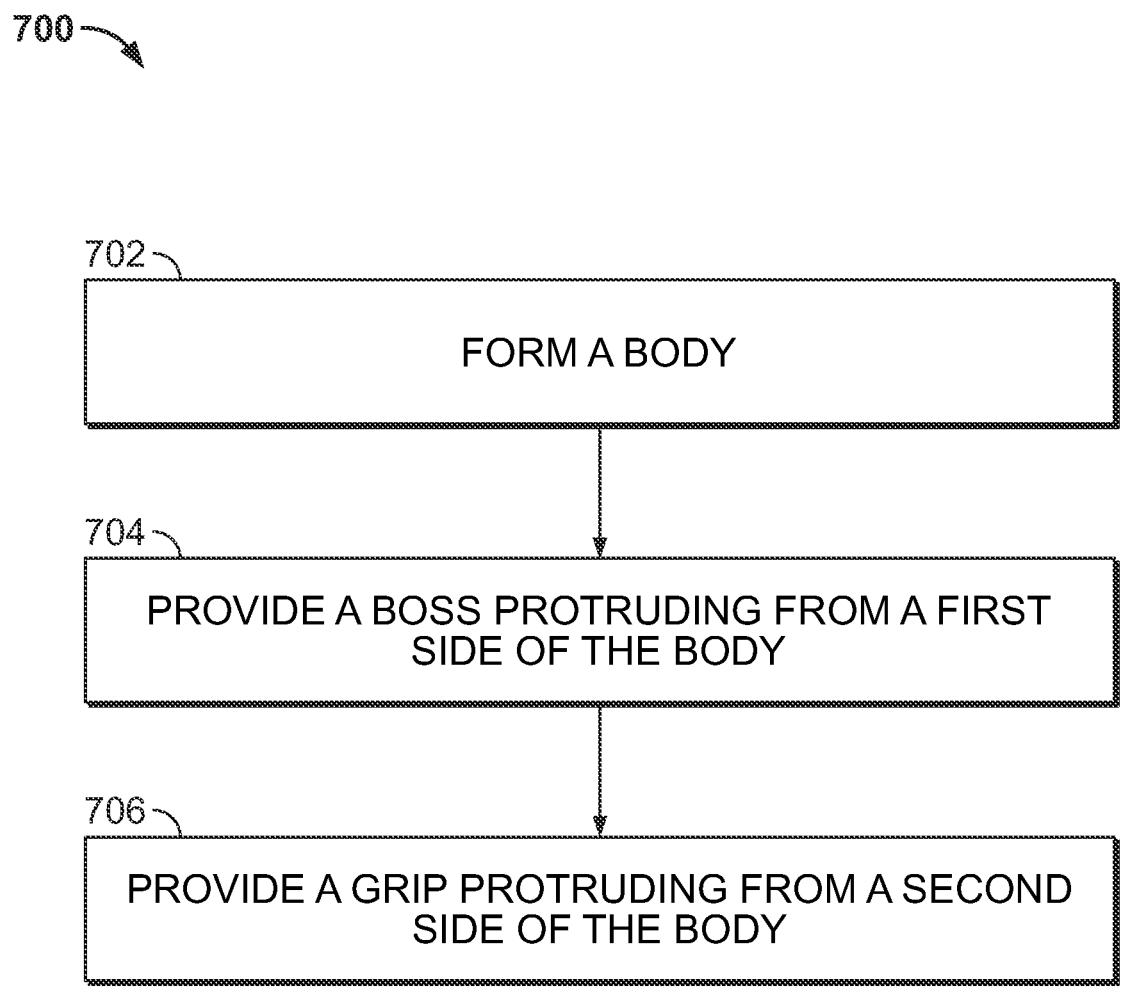
FIG. 7 is a flowchart representative of an example method for manufacturing a cover apparatus disclosed herein.

FIG. 7 is a flowchart representative of an example method for manufacturing a cover apparatus (e.g., the cover apparatus 400) disclosed herein. Although the example method is described with reference to the flowchart illustrated in FIG. 7, many other methods of implementing the example cover apparatus may alternatively be used. For example, the order of the blocks of the flowchart may be changed, and/or some of the blocks described may be changed, eliminated, or combined.

The method 700 begins by forming a body (block 702). For example, the body 402 can be formed defining the first side 404 and the second side 406. The method 700 includes providing a boss protruding from the first side (block 704). For example, the boss 418 can be formed with the body 402 and protrudes from the first side 404 of the body 402. In some examples, the boss 418 is formed with a diameter that is greater than the diameter of the bearing bore 514 of the bearing to which the cover apparatus 400 is to couple. The method 700 includes providing a grip protruding from a second side of the body (block 706). For example, the grip is formed with the body 402 and protrudes from the second side 406 of the body 402 opposite a protrusion direction of the boss 418. In some examples, the method 700 includes forming the body with the first seating surface 412 and the second seating surface 414 recessed relative to the first seating surface 412 on the first side 404 of the body 402. As noted above, the cover apparatus 400 can be formed via injection molding, additive manufacturing (e.g., three-dimensional printing) and/or any other manufacturing process(es). In some examples, the cover apparatus 400 is formed in components and then coupled together via fasteners, chemical fasteners, adhesive, thermal welding, welding and/or any other fastening techniques. The cover apparatus 400 can be made from plastic material(s), rubber material(s), thermoplastic material(s), thermoset material(s) and/or any other material(s).

In some examples, the cover apparatus 400 and/or the cover assembly 500 can be modified to different types of bearings. For example, bearings can include central bores having diameters and/or thickness that are different than (e.g., larger or smaller) than the diameters (e.g., diameters 512, 516, etc.) and/or thickness (e.g., thickness 518) of the bearing 310 and/or the bearing 502. In such instances, the cover apparatus 400 can be made with different (e.g., larger, or smaller) size boss diameters (e.g., boss diameters 422), boss lengths (e.g., boss length 424), body diameters (e.g., the body diameter 416). In other words, the cover apparatus 400 disclosed herein can be custom made to fit different bearings.

Example cover apparatus are disclosed herein. Further examples and combinations thereof include the following:

Example 1 includes a cover apparatus including a body defining a first side and a second side opposite the first side. The body is dimensioned to provide a stop against an outer surface of a bearing. A boss protrudes from the first side of the body. The boss is dimensioned for a press-fit connection with a bearing bore of the bearing. A knob protrudes from the second side of the body opposite the first side.

Example 2 includes the cover apparatus of example 1, where the body is dimension greater than the bearing bore of the bearing.

Example 3 includes the cover apparatus of any of examples 1 and 2, where the first side of the body includes a recess defining a cavity.

Example 4 includes the cover apparatus of any one of examples 1-3, where the boss protrudes from a base surface of the cavity defined by the rec.

Example 5 includes the cover apparatus of any of examples 1-4, where the first side of the body defines a first seating surface and a second seating surface different than the first seating surface.

Example 6 includes the cover apparatus of any of examples 1-5, where the first seating surface engages a first side surface of an outer ring of the bearing and the second seating surface engages a first side surface of an inner ring of the bearing.

Example 7 includes the cover apparatus of any of examples 1-6, where the second seating surface is recessed relative to the first seating surface.

Example 8 includes the cover apparatus of any one of examples 1-7, where the boss protrudes from the second seating surface.

Example 9 includes the cover apparatus of any of examples 1-8, where the first seating surface has a first diameter that is substantially equal to an outside diameter of an outer ring of the bearing.

Example 10 includes the cover apparatus of any of examples 1-9, where the second seating surface has a second diameter that is greater than an outside diameter of an inner ring of the bearing.

Example 11 includes the cover apparatus of any of examples 1-10, where the boss has a length that is at least one of half of a thickness of the bearing or less than half the thickness of the bearing, the thickness of the bearing provided between a first side of an outer ring of the bearing and a second side of the outer ring of the bearing opposite the first side.

Example 12 includes the cover apparatus of any of examples 1-11, where the cover apparatus is to remain engaged with the bearing via a frictional force between an inner surface of the bearing bore and an outer surface of the boss.

Example 13 includes the cover apparatus of any of examples 1-12, where the cover apparatus is removably coupled to the bearing via the knob.

Example 14 includes the cover apparatus of any of examples 1-13, where the boss has a diameter that is greater than a diameter of the bearing bore of the bearing, the boss to is to compress circumferentially when the boss is inserted into the bearing bore.

Example 15 includes a cover assembly for use with a bearing, the cover assembly including a first cover to couple to a first side of a bearing, the first cover including a first protrusion, a first seating surface and a second seating surface. The first cover is dimensioned to be press-fit into a bore of the bearing. The cover assembly includes a second cover to couple to a second side of the bearing opposite the first side. The second cover includes a second protrusion, a third seating surface and a fourth seating surface. The second cover is dimensioned to be press-fit into the bore of the bearing.

Example 16 includes the cover assembly of example 15, where the first protrusion is dimensioned to be press-fit into a first side of the bore and the second protrusion is dimensioned to be press-fit into a second side of the bore.

Example 17 includes the cover assembly of examples 15 or 16, where the first cover and the second cover are coupled to the bearing via a friction-fit connection provided by a first interface between the first protrusion and the bore of the bearing and a second interface provided by the second protrusion and the bore of the bearing.

Example 18 includes the cover assembly of any of examples 15-17, where the first seating surface engages a first side of an outer ring of the bearing, the second seating surface engages a first side of an inner ring of the bearing, and the first protrusion is at least partially inserted in the bore of the bearing when the first cover is coupled to a first side of the bearing.

Example 19 includes a method of forming a cover for a bearing, the method including forming a body defining a first side and a second side, providing a boss protruding from the first side, the boss having a diameter that is greater than a bore diameter of a bearing to which the cover is to couple, and providing a grip protruding from the second side of the body.

Example 20 includes the method of example 19, where forming the body further includes forming a first seating surface and a second seating surface recessed relative to the first seating surface on the first side of the body.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A cover apparatus for a bearing comprising:
a body defining a first side and a second side opposite the first side, the body dimensioned to provide a stop against an outer surface of a bearing;
a boss protruding from the first side of the body, the boss dimensioned for a press-fit connection with a bearing bore of the bearing; and
a conical knob protruding from the second side of the body opposite the first side.

2. The cover apparatus of claim 1, wherein the body is dimension greater than the bearing bore of the bearing.

3. The cover apparatus of claim 1, wherein the first side of the body includes a recess defining a cavity.

4. The cover apparatus of claim 3, wherein the boss protrudes from a base surface of the cavity defined by the recess.

5. The cover apparatus of claim 1, wherein the first side of the body defines a first seating surface and a second seating surface different than the first seating surface.

6. The cover apparatus of claim 5, wherein the first seating surface engages a first side surface of an outer ring of the bearing and the second seating surface engages a first side surface of an inner ring of the bearing.

7. The cover apparatus of claim 5, wherein the second seating surface is recessed relative to the first seating surface.

8. The cover apparatus of claim 7, wherein the boss protrudes from the second seating surface.

9. The cover apparatus of claim 5, wherein the first seating surface has a first diameter that is substantially equal to an outside diameter of an outer ring of the bearing.

10. The cover apparatus of claim 9, wherein the second seating surface has a second diameter that is greater than an outside diameter of an inner ring of the bearing.

11. The cover apparatus of claim 1, wherein the boss has a length that is at least one of half of a thickness of the bearing or less than half the thickness of the bearing, the thickness of the bearing provided between a first side of an outer ring of the bearing and a second side of the outer ring of the bearing opposite the first side.

12. The cover apparatus of claim 1, wherein the cover apparatus is to remain engaged with the bearing via a frictional force between an inner surface of the bearing bore and an outer surface of the boss.

13. The cover apparatus of claim 1, wherein the cover apparatus is removably coupled to the bearing via the knob.

14. The cover apparatus of claim 1, wherein the boss has a diameter that is greater than a diameter of the bearing bore of the bearing, the boss to is to compress circumferentially when the boss is inserted into the bearing bore.

15. A cover assembly for use with a bearing, the cover assembly comprising:
a first cover to couple to a first side of a bearing, the first cover including a first protrusion, a first seating surface and a second seating surface, the first protrusion dimensioned to be press-fit into a bore of the bearing, the first seating surface engages a first side of an outer ring of the bearing;
a second cover to couple to a second side of the bearing opposite the first side, the second cover including a second protrusion, a third seating surface and a fourth seating surface, the second cover dimensioned to be press-fit into the bore of the bearing and the first cover tethered to the second cover.

16. The cover assembly of claim 15, wherein the first protrusion is dimensioned to be press-fit into a first side of the bore and the second protrusion is dimensioned to be press-fit into a second side of the bore.

17. The cover assembly of claim 15, wherein the first cover and the second cover are dimensioned to be coupled to the bearing via a friction-fit connection provided by a first interface between the first protrusion and the bore of the bearing and a second interface provided by the second protrusion and the bore of the bearing.

18. The cover assembly of claim 15, wherein the second seating surface engages a first side of an inner ring of the bearing, and the first protrusion is at least partially inserted in the bore of the bearing when the first cover is coupled to a first side of the bearing.

19. A method of forming a cover for a bearing, the method comprising:
forming a body defining a first side and a second side;
providing a boss protruding from the first side, the boss having a diameter that is greater than a bore diameter of a bearing to which the cover is to couple; and
providing a conical grip protruding from the second side of the body.

20. The method of claim 19, wherein forming the body further includes forming a first seating surface and a second seating surface recessed relative to the first seating surface on the first side of the body.

* * * * *